US011234240B2

(12) United States Patent
Dai et al.

(10) Patent No.: US 11,234,240 B2
(45) Date of Patent: Jan. 25, 2022

(54) WIRELESS TELECOMMUNICATIONS NETWORK

(71) Applicant: BRITISH TELECOMMUNICATIONS PUBLIC LIMITED COMPANY, London (GB)

(72) Inventors: Linglong Dai, London (GB); Wenqian Shen, London (GB); Jianjun Li, London (GB); Richard Mackenzie, London (GB); Mo Hao, London (GB)

( * ) Notice: Subject to any disclaimer, the term of this patent is extended or adjusted under 35 U.S.C. 154(b) by 0 days.

(21) Appl. No.: 17/250,175

(22) PCT Filed: Jun. 4, 2019

(86) PCT No.: PCT/EP2019/064549
§ 371 (c)(1),
(2) Date: Dec. 8, 2020

(87) PCT Pub. No.: WO2019/234059
PCT Pub. Date: Dec. 12, 2019

(65) Prior Publication Data
US 2021/0250938 A1    Aug. 12, 2021

(30) Foreign Application Priority Data
Jun. 8, 2018   (CN) .......................... 201810589433.3

(51) Int. Cl.
*H04B 7/00* (2006.01)
*H04W 72/04* (2009.01)
(Continued)

(52) U.S. Cl.
CPC ........ *H04W 72/046* (2013.01); *H04B 7/0408* (2013.01); *H04B 7/0617* (2013.01); *H04W 16/28* (2013.01); *H04W 84/12* (2013.01)

(58) Field of Classification Search
CPC ..... H04W 16/00; H04W 16/02; H04W 16/10; H04W 16/12; H04W 16/24; H04W 16/28;
(Continued)

(56) References Cited

U.S. PATENT DOCUMENTS

| 4,189,675 A | * | 2/1980 | Frosch ................. H04B 7/2041 455/13.2 |
| 5,889,494 A | * | 3/1999 | Reudink ............... H04W 16/28 342/373 |

(Continued)

FOREIGN PATENT DOCUMENTS

| CN | 101331779 A | 12/2008 |
| CN | 101584175 A | 11/2009 |

(Continued)

OTHER PUBLICATIONS

3GPP TSG RAN WG 1 Meeting #84bis, "CSI Enhancements for Hybrid FD-MIMO," R1-163187, Agenda Item: 7.3.2.2, Intel and Corporation, Discussion and decision, Busan, Korean, Apr. 11-15, 2016, 4 pages.

(Continued)

*Primary Examiner* — Dmitry Levitan
(74) *Attorney, Agent, or Firm* — Patterson Thuente Pedersen, P.A.

(57) ABSTRACT

This disclosure provides a method in a wireless telecommunications network, and a wireless telecommunications network node for implementing the method, the network including a transmitter having an overall coverage area and a plurality of User Equipment (UE) within the transmitter's overall coverage area, the method including receiving data indicating a first count of UEs of the plurality of UEs disposed in a first section of the transmitter's overall coverage area and further indicating a second count of UEs of the plurality of UEs disposed in a second section of the transmitter's overall coverage area; comparing the first and
(Continued)

second counts to a predetermined threshold; and transmitting a first data beam having a first beam coverage area and a second data beam having a second beam coverage area, wherein a magnitude of the first beam coverage area is based on the comparison of the first count to the predetermined threshold and a magnitude of the second beam coverage area is based on upon the comparison of the second count to the predetermined threshold.

13 Claims, 7 Drawing Sheets

(51) Int. Cl.
    *H04B 7/0408* (2017.01)
    *H04B 7/06* (2006.01)
    *H04W 16/28* (2009.01)
    *H04W 84/12* (2009.01)

(58) Field of Classification Search
    CPC ............ H04W 72/04; H04W 72/0413; H04W 72/046; H04W 72/0486
    USPC ........................................ 370/310, 328, 339
    See application file for complete search history.

(56) References Cited

U.S. PATENT DOCUMENTS

| | | | |
|---|---|---|---|
| 6,118,767 A * | 9/2000 | Shen | H04B 1/7097 370/252 |
| 6,122,266 A * | 9/2000 | Lynch | H04W 16/00 370/335 |
| 6,246,674 B1 * | 6/2001 | Feuerstein | H01Q 1/246 370/334 |
| 6,611,511 B1 * | 8/2003 | Schulz | H04B 7/0408 370/278 |
| 6,697,644 B2 * | 2/2004 | Scherzer | H04W 16/28 455/446 |
| 6,937,863 B1 * | 8/2005 | Gordon | H04W 16/06 455/446 |
| 7,363,039 B2 | 4/2008 | Laroia et al. | |
| 7,885,235 B2 | 2/2011 | Mochizuki et al. | |
| 8,554,211 B2 | 10/2013 | Angelow et al. | |
| 8,588,171 B2 | 11/2013 | Fukuoka et al. | |
| 8,644,261 B1 | 2/2014 | Vargantwar | |
| 8,670,778 B2 * | 3/2014 | Si | H04W 16/04 455/453 |
| 9,001,737 B2 | 4/2015 | Amerga et al. | |
| 9,030,988 B2 | 5/2015 | Sayeed et al. | |
| 9,042,323 B1 * | 5/2015 | Marupaduga | H04B 7/0408 370/329 |
| 9,191,922 B2 | 11/2015 | Anchan et al. | |
| 9,380,526 B2 | 6/2016 | Koivisto et al. | |
| 9,439,171 B2 | 9/2016 | Phan et al. | |
| 9,648,584 B2 | 5/2017 | Hiben et al. | |
| 9,712,995 B2 * | 7/2017 | Seo | H04W 24/10 |
| 9,723,523 B2 | 8/2017 | Purnadi et al. | |
| 9,763,151 B2 | 9/2017 | Kim | |
| 9,820,259 B2 | 11/2017 | Wang et al. | |
| 9,826,502 B2 | 11/2017 | Cherian et al. | |
| 9,860,935 B2 | 1/2018 | Teyeb et al. | |
| 10,070,413 B2 | 9/2018 | Phan et al. | |
| 10,075,883 B2 | 9/2018 | Zhao et al. | |
| 10,084,581 B2 | 9/2018 | Sun et al. | |
| 10,219,245 B2 | 2/2019 | Prasad et al. | |
| 10,231,174 B2 | 3/2019 | Byun et al. | |
| 10,277,416 B2 | 4/2019 | Zhu et al. | |
| 10,299,182 B2 | 5/2019 | Nagasaka et al. | |
| 10,419,893 B2 | 9/2019 | Åkesson et al. | |
| 10,728,714 B2 | 7/2020 | Al-Daher et al. | |
| 10,735,923 B2 * | 8/2020 | Wu | H04W 4/40 |
| 2002/0067909 A1 | 6/2002 | Iivonen | |
| 2002/0112244 A1 | 8/2002 | Liou et al. | |
| 2004/0106412 A1 | 6/2004 | Laroia et al. | |
| 2004/0240410 A1 * | 12/2004 | Hayashi | H04W 88/08 370/329 |
| 2007/0135170 A1 | 6/2007 | Khan et al. | |
| 2008/0132263 A1 | 6/2008 | Yu et al. | |
| 2008/0267317 A1 | 10/2008 | Malladi | |
| 2009/0175183 A1 | 7/2009 | Mochizuki et al. | |
| 2009/0274453 A1 | 11/2009 | Viswambharan et al. | |
| 2010/0035627 A1 | 2/2010 | Hou et al. | |
| 2010/0077441 A1 | 3/2010 | Thomas et al. | |
| 2010/0216454 A1 | 8/2010 | Ishida et al. | |
| 2011/0032832 A1 | 2/2011 | Jalali et al. | |
| 2011/0305184 A1 | 12/2011 | Hsu | |
| 2013/0028118 A1 | 1/2013 | Cherian et al. | |
| 2013/0044614 A1 | 2/2013 | Aguirre et al. | |
| 2013/0170424 A1 | 7/2013 | Anchan et al. | |
| 2013/0170818 A1 | 7/2013 | Klappert et al. | |
| 2013/0229974 A1 | 9/2013 | Xu et al. | |
| 2013/0251329 A1 | 9/2013 | McCoy et al. | |
| 2013/0258934 A1 | 10/2013 | Amerga et al. | |
| 2013/0258935 A1 | 10/2013 | Zhang et al. | |
| 2013/0336173 A1 | 12/2013 | Mandil et al. | |
| 2014/0095668 A1 | 4/2014 | Oyman | |
| 2014/0156800 A1 | 6/2014 | Falvo | |
| 2014/0169255 A1 | 6/2014 | Zhang et al. | |
| 2014/0192697 A1 | 7/2014 | Anchan et al. | |
| 2014/0286222 A1 | 9/2014 | Yu et al. | |
| 2014/0321826 A1 | 10/2014 | Stelmack et al. | |
| 2014/0323143 A1 * | 10/2014 | Jung | H04L 5/0025 455/452.1 |
| 2015/0009821 A1 | 1/2015 | Sridhar et al. | |
| 2015/0117323 A1 | 4/2015 | Hiben et al. | |
| 2015/0163379 A1 | 6/2015 | Herzog | |
| 2016/0028519 A1 | 1/2016 | Wei | |
| 2016/0081070 A1 | 3/2016 | Li et al. | |
| 2016/0105894 A1 | 4/2016 | Lu et al. | |
| 2016/0211980 A1 | 7/2016 | Zhu et al. | |
| 2016/0234570 A1 | 8/2016 | Van Deventer et al. | |
| 2016/0269189 A1 | 9/2016 | Xu et al. | |
| 2018/0263074 A1 | 9/2018 | Wang et al. | |
| 2019/0229789 A1 * | 7/2019 | Zhang | H04B 7/0695 |
| 2019/0268197 A1 | 8/2019 | Al-Daher et al. | |

FOREIGN PATENT DOCUMENTS

| | | |
|---|---|---|
| CN | 102300168 A | 12/2011 |
| CN | 102379100 A | 3/2012 |
| CN | 102405665 A | 4/2012 |
| CN | 103535093 A | 1/2014 |
| CN | 103546477 A | 1/2014 |
| CN | 103797873 A | 5/2014 |
| CN | 104105070 A | 10/2014 |
| CN | 104303545 A | 1/2015 |
| CN | 104540043 A | 4/2015 |
| CN | 104954994 A | 9/2015 |
| CN | 105103575 A | 11/2015 |
| CN | 105684473 A | 6/2016 |
| EP | 1650989 A1 | 4/2006 |
| EP | 2244502 A1 | 10/2010 |
| EP | 2244502 B1 | 6/2011 |
| EP | 2606662 A1 | 6/2013 |
| EP | 2775730 A1 | 9/2014 |
| EP | 2925003 A1 | 9/2015 |
| EP | 3125582 A1 | 2/2017 |
| GB | 2483125 A | 2/2012 |
| JP | 2013070841 A | 4/2013 |
| WO | WO-2009094744 A1 | 8/2009 |
| WO | WO-2012137078 A2 | 10/2012 |
| WO | WO-2012142428 A1 | 10/2012 |
| WO | WO-2013141874 A1 | 9/2013 |
| WO | WO-2014146617 A1 | 9/2014 |
| WO | WO-2015000912 A1 | 1/2015 |
| WO | WO-2015039888 A1 | 3/2015 |
| WO | WO-2015061983 A1 | 5/2015 |
| WO | WO-2015062443 A1 | 5/2015 |
| WO | WO-2015069407 A1 | 5/2015 |
| WO | WO-2015071461 A1 | 5/2015 |
| WO | WO-2015080407 A1 | 6/2015 |
| WO | WO-2015103947 A1 | 7/2015 |

(56) References Cited

FOREIGN PATENT DOCUMENTS

| WO | WO-2015166087 A2 | 11/2015 |
|---|---|---|
| WO | WO-2016029938 A1 | 3/2016 |
| WO | WO-2017089183 A1 | 6/2017 |
| WO | WO-2017167648 A1 | 10/2017 |
| WO | WO-2017167835 A1 | 10/2017 |
| WO | WO-2017167838 A1 | 10/2017 |
| WO | WO-2017193934 A1 | 11/2017 |
| WO | WO-2018001897 A1 | 1/2018 |
| WO | WO-2018024395 A1 | 2/2018 |

OTHER PUBLICATIONS

International Search Report and Written Opinion for PCT Application No. PCT/EP2019/064549 dated Sep. 11, 2019, 15 pages.
3GPP TR 23.768 V12.1.0 (May 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.
3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.
Application and Filing Receipt for U.S. Appl. No. 15/774,934, filed May 9, 2018, Inventor(s): Rennison et al., 201 pages.
Application and Filing Receipt for U.S. Appl. No. 16/318,533, filed Jan. 17, 2019, inventors Al-Daher et al.
Application as filed for U.S. Appl. No. 16/318,553, filed Jan. 17, 2019, 9 pages, Inventor(s): Al-Daher et al..
Application as filed for U.S. Appl. No. 16/310,948, filed Dec. 18, 2018, Inventor(s):Mackenzie., et al., 282 pages.
CATT, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
CATT, "Evaluation on Service Continuity for eMBMS," 3GPP Draft; R2-140138, 3rd Generation Partnership Project (3GPP), Mobile Competence Centre ; 650, Route Des Lucioles ; F-06921 Sophia-Antipolis Cedex; France, vol. Ran WG2, Feb. 9, 2014, retrieved from URL: http://www.3gpp.org/ftp/Meetings_3GPP_SYNC/RAN2/Docs/, 3 pages.
CATT, "Methods for Service Continuity Improvement due to UE Mobility," 3GPP Draft; R2-140141, 3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.
Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
Combined Search and Examination Report under Section 17 and 18(3) for GB Application No. 1613477.7, dated Dec. 19, 2016, 5 pages.
Communication Pursuant to Article 94(3) EPC for Application No. 17713043.2, dated Feb. 11, 2021, 6 pages.
DVB Organization: "ts_102796v010301p_draft_23-non-etsi-branding.pdf", DVB, Digital Video Broadcasting, C/O EBU—17A Ancienne Route—CH-1218 Grand Saconnex, Geneva—Switzerland, Oct. 9, 2014 (Oct. 9, 2014), XP017845818.
Ericsson, "MBMS Service Continuity Aspects for Group Communication," 3GPP Draft; R2-140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
ETSI TS 103 286-2 VI.I.1 (May 2015), "Technical Specification; Digital Video Broadcasting (DVB), Companion Screens and Streams, Part 2: Content Identification and Media Synchronization," 650 Route des Lucioles F-06921 Sophia Antipolis Cedex, France, https://www.etsi.org/deliver/etsi_ts/103200_103299/10328602/01.01.01_60/ts_10328602v010101p.pdf, retrieved on Apr. 24, 2018, 166 pages.
ETSI TS 123.246 "Universal Mobile Telecommunication System (UMTS); LTE; Multimedia Broadcast/Multicast Service (MBMS); Architecture and Functional Description (Release 9)," V9.5.0 (May 2010); the 3rd Generation Partnership Project, pp. 1-67.
European Search Report for Application No. 16176922.9, dated Nov. 23, 2016, 11 pages.
European Search Report for Application No. 16163451.4, dated Sep. 28, 2016, 8 pages.
European Search Report for Application No. 16163458.9, dated Sep. 20, 2016, 11 pages.
European Search Report for Application No. 16172341.6, dated Jun. 14, 2017, 10 pages.
European Search Report for Application No. 16182850.4, dated Jan. 17, 2017, 7 pages.
European Search Report for Application No. EP15196875.7, dated May 19, 2016, 6 pages.
Examination Report for GB Application No. GB1611277.3, dated Jun. 26, 2019, 4 pages.
Examination Report for Great Britain Application No. 1521000.8 dated Nov. 27, 2017, 12 pages.
Examination Report for Great Britain Application No. 1605519.6 dated Sep. 27, 2018, 4 pages.
Examination Report under Section 18(3) for Great Britain Application No. 1605519.6 dated Jul. 5, 2019, 4 pages.
Examination Report under Section 18(3) for Great Britain Application No. 1609547.3, dated Aug. 20, 2019, 2 pages.
First Office Action for Chinese Application No. 201780040711.3, dated Aug. 4, 2020, 12 pages.
"HbbTV 2.0.2 Specification," HbbTV Association, Retrieved on Apr. 24, 2018 from https://www.hbbtv.org/wp-content/uploads/2018/02/HbbTV_v202_specification_2018_02_16.pdf, Feb. 16, 2018, 313 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
U.S. Appl. No. 16/085,257, filed Sep. 14, 2018, Inventors: Mackenzie et al, 189 pages.
U.S. Appl. No. 16/085,328, filed Sep. 14, 2018, Inventors: Mackenzie et al, 187 pages.
U.S. Appl. No. 16/085,382, filed Sep. 14, 2018, Inventors: Al-Daher et al, 193 pages.
U.S. Appl. No. 16/310,948, filed Dec. 18, 2018, Inventor(s): MacKenzie et al, 282 pages.
International Preliminary Report on Patentability for Application No. PCT/EP2016/077747, dated Jan. 18, 2018, 10 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Preliminary Report on Patentability for Application No. PCT/EP2017/064946, dated Feb. 14, 2019, 7 pages.
International Preliminary Report on Patentability for corresponding PCT Application No. PCT/EP2017/065543, dated Aug. 17, 2018, 29 pages.
International Search Report and Written Opinion for Application No. PCT/EP2016/077747, dated Jan. 24, 2017, 12 pages.

(56) References Cited

OTHER PUBLICATIONS

International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/064946, dated Jul. 10, 2017, 13 pages.
International Search Report and Written Opinion for Application No. PCT/EP2017/065543, dated Jul. 24, 2017, 17 pages.
LG Electronics INC, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.
Office Action for Chinese Application No. 201780015375.7, dated Jun. 3, 2021, 3 pages.
Office Action for Chinese Application No. 201780015375.7, dated Sep. 29, 2020, 17 pages.
Office Action for Chinese Application No. 201780048245.3, dated Nov. 30, 2020, 9 pages.
Prasad A et al., "Enhancements for Enabling Point-to-Multipoint Communication Using Unlicensed Spectrum," May 1, 2018, 7 pages.
Prasad A., et al., "Enabling Group Communications for Public Safety in LTE-Advanced Networks," Journal of Network and Computer Applications, vol. 62, 2016, pp. 41-52.
Prasad A., et al., "Enhancements for Enabling Point-to-Multipoint Communication Using Unlicensed Spectrum," Retrieved from https://www.reserachgate.net/publication/324783210, 2018, 7 pages.
QUALCOMM Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Qualcomm "LTE Evolved Multimedia Broadcast Multicast Service (eMBMS) Technology Overview," Qualcomm Research, San Diego, Nov. 2012, 18 pages.
Sharetechnote, "Multi Cell—Measurement in LTE," Nov. 28, 2019, 16 pages.
Small Cell Forum, "X2 Interoperability," Release Four, Document 059.04.01, www.smallcellforum.org, Jun. 2014, 29 pages.
Written Opinion of the International Preliminary Examining Authority for Application PCT/EP2017/065543, dated Jun. 1, 2018, 11 pages.
Wu, et al., "CloudMoV: Cloud-based Mobile Social TV," Retrieved on Apr. 24, 2018 from https://i.cs.hku.hk/~cwu/papers/ywu-tmm12.pdf, 2012, 12 pages.
Zhang X., "LTE Optimization and Principle and Method," Jan. 2018, 47 pages.
ZTE, "Service Continuity for Group Communication due to UE Mobility," 3GPP Draft; R2-140101, 3GPP TSG-RAN WG2#85, and Agenda Item: 7.6.3, Prague, Czech Republic, Feb. 10-14, 2014, 3 pages.

\* cited by examiner

WIRELESS TELECOMMUNICATIONS NETWORK

PRIORITY CLAIM

The present application is a National Phase entry of PCT Application No. PCT/EP2019/064549, filed Jun. 4, 2019, which claims priority from CN Patent Application No. 201810589433.3, filed Jun. 8, 2018, each of which is hereby fully incorporated herein by reference.

TECHNICAL FIELD

The present disclosure relates to a wireless telecommunications network, including cellular telecommunications networks and wireless local area networks.

BACKGROUND

Wireless telecommunications networks utilize radio frequency transmissions to communicate. As user demands on wireless telecommunications networks have increased (e.g. for higher data rates), wireless networks have been designed to exploit relatively high radio frequencies (compared to those used in earlier telecommunications networks) and therefore correspondingly short wavelengths, such as millimeter waves ("mmWave"). However, there are problems associated with these wireless networks, including the relatively short propagation distances. In order to compensate for this, a technique known as beamforming is used to provide directional transmissions between multiple transmitters and (one or more) receivers. Each signal transmitted from each of the multiple transmitters is altered before transmission so that the combination of each signal at the receiver interferes constructively to improve the signal gain, thus improving data rates or reliability compared to omni-directional transmitters.

One implementation of a beamforming technique is in the $3^{rd}$ Generation Partnership Project (3GPP) Long Term Evolution (LTE) protocol for cellular telecommunications networks. In these cellular networks, a base station transmits a plurality of beams about its coverage area, and a User Equipment (UE) selects one of these beams to receive data. In LTE Release 13, a two-stage beam management method was proposed for the base station and UE to select a beam and configure it (e.g. by defining a specific beam direction) for subsequent data transmission. In a first stage, known as beam selection, the base station transmits periodic reference signals about its entire coverage area via a plurality of beams. These are known as Beam Formed (BF) Channel State Information-Reference Symbols (CSI-RS), and the transmission is common to all users. A UE receives one or more of these BF CSI-RSs and, in response, sends a CSI-RS Indicator (CRI) to the base station identifying its preferred beam. In the second stage of the beam management method, known as beam refinement, the base station again issues a periodic reference signal, but this is now UE-specific and is sent to the UE via the preferred beam identified in the CRI. This is known as a UE-specific BF CSI-RS and is used to refine the channel parameter estimates for a single UE.

The first stage BF CSI-RSs are transmitted for a relatively long time period compared to the second stage UE-specific BF CSI-RSs. In doing so, the overhead for CSI estimation is reduced. However, the present inventors have identified a problem in that the number (i.e. count) of UEs sharing a particular UE-specific BF CSI-RS beam may exceed the number of data streams that the UE-specific CSI-RS beam may support. It is therefore desirable to alleviate this problem.

SUMMARY

According to a first aspect of the disclosure, there is provided a method in a wireless telecommunications network, the network including a transmitter having an overall coverage area and the network further including a plurality of User Equipment, UE, within the transmitter's overall coverage area, the method comprising: receiving data indicating a first count of UEs of the plurality of UEs disposed in a first section of the transmitter's overall coverage area and further indicating a second count of UEs of the plurality of UEs disposed in a second section of the transmitter's overall coverage area; comparing the first and second counts to a predetermined threshold; and transmitting a first data beam having a first beam coverage area and a second data beam having a second beam coverage area, wherein a magnitude of the first beam coverage area is based on the comparison of the first count to the predetermined threshold and a magnitude of the second beam coverage area is based on upon the comparison of the second count to the predetermined threshold.

Receiving data indicating the first and second counts may include the sub-steps of: transmitting a set of first-stage beams about the transmitter's overall coverage area, wherein each first-stage beam of the set of first-stage beams covers a respective first-stage beam coverage area being substantially equal in size to the first beam coverage area; receiving data from each UE identifying a preferred beam of the set of first-stage beams, wherein the first count is the count of UEs identifying a first first-stage beam of the set of first-stage beams as their preferred beam, and the second count is the count of UEs identifying a second first-stage beam of the set of first-stage beams as their preferred beam.

Following a positive determination that the second count is above the predetermined threshold, the method may further comprise transmitting a set of second-stage beams about the second first-stage beam's coverage area, wherein each second-stage beam of the set of second-stage beams covers a respective second-stage coverage area being substantially equal to the second beam coverage area; and receiving data from each UE identifying a preferred beam of the set of second-stage beams.

The received data may further indicate a third count of UEs of the plurality of UEs disposed within a first second-stage beam of the set of second-stage beams and a fourth count of UEs of the plurality of UEs disposed within a second second-stage beam of the set of second-stage beams, and the method may further comprise determining that the fourth count of UEs is above the predetermined threshold; and transmitting a set of third-stage beams about the second second-stage beam's coverage area, wherein each third-stage beam of the set of third-stage beams covers a respective third-stage coverage area being smaller than the second beam coverage area.

The transmitter may be part of a Wireless Local Area Network (WLAN) network node and/or a cellular telecommunications network node.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a wireless telecommunications network node comprising a processor and a transmitter, wherein the processor is configured to: receive data indicating a first count of UEs of the plurality of UEs disposed in a first section of the transmitter's overall coverage area and further indicating a second count of UEs of the plurality of UEs disposed in a second section of the transmitter's overall coverage area; compare the first and second counts to a predetermined threshold; and transmit a first data beam having a first beam coverage area and a second data beam having a second beam coverage area, wherein a magnitude of the first beam coverage area is based on the comparison of the first count to the predetermined threshold and a magnitude of the second beam coverage area is based on upon the comparison of the second count to the predetermined threshold.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
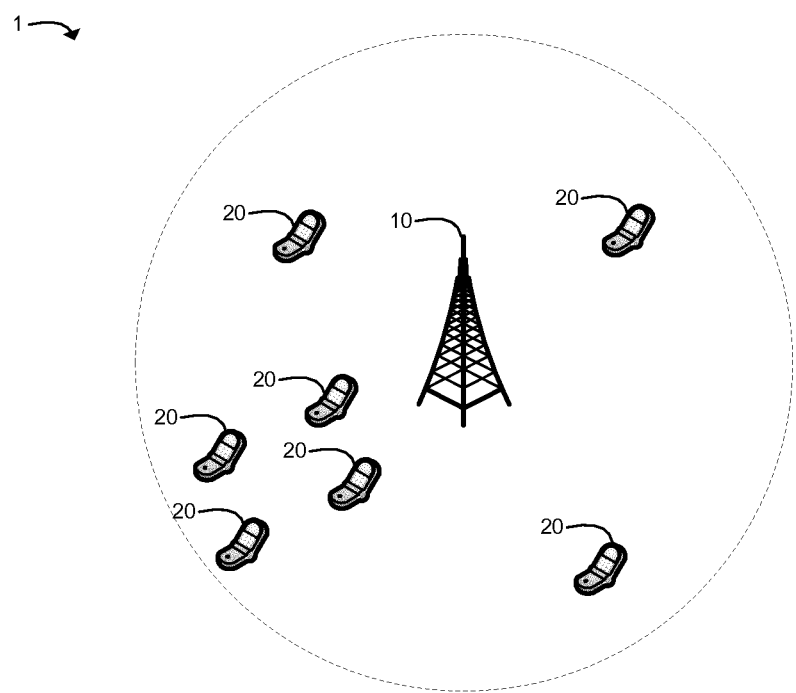
FIG. 1 is a schematic diagram illustrating a cellular telecommunications network of an embodiment of the present disclosure.

An embodiment of a cellular telecommunications network 1 will now be described with reference to FIGS. 1 to 4 and 6 to 7. As shown in FIG. 1, the cellular network 1 includes a base station 10 and a plurality of User Equipment 20. In this embodiment, the base station 10 is configured to transmit signals via a plurality of beams, and an approximation of the combined coverage area of these plurality of beams is shown by the enveloping circle (in dotted lines) around the base station 10.

Figure 2:
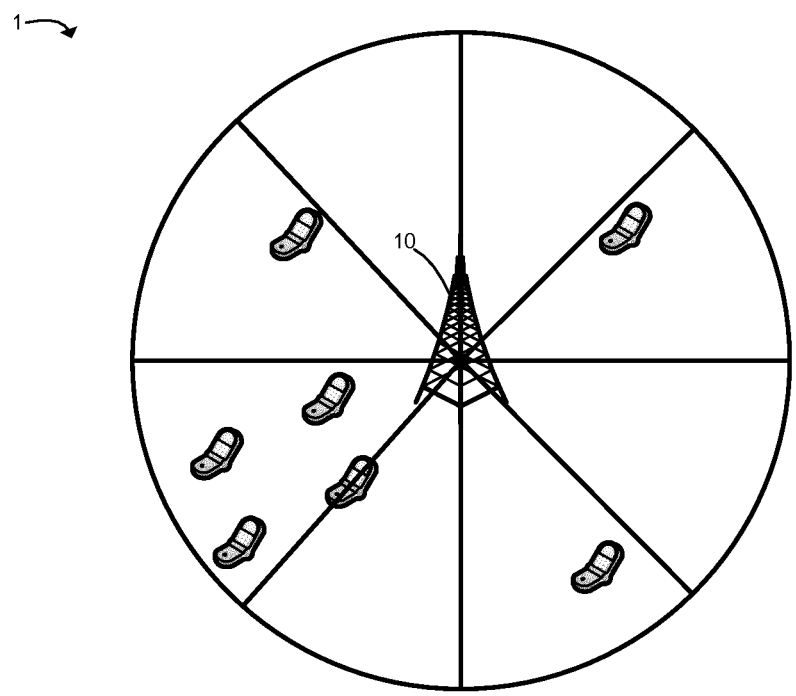
FIG. 2 is a schematic diagram illustrating a first transmission option of a base station of the network of FIG. 1.
Figure 3:
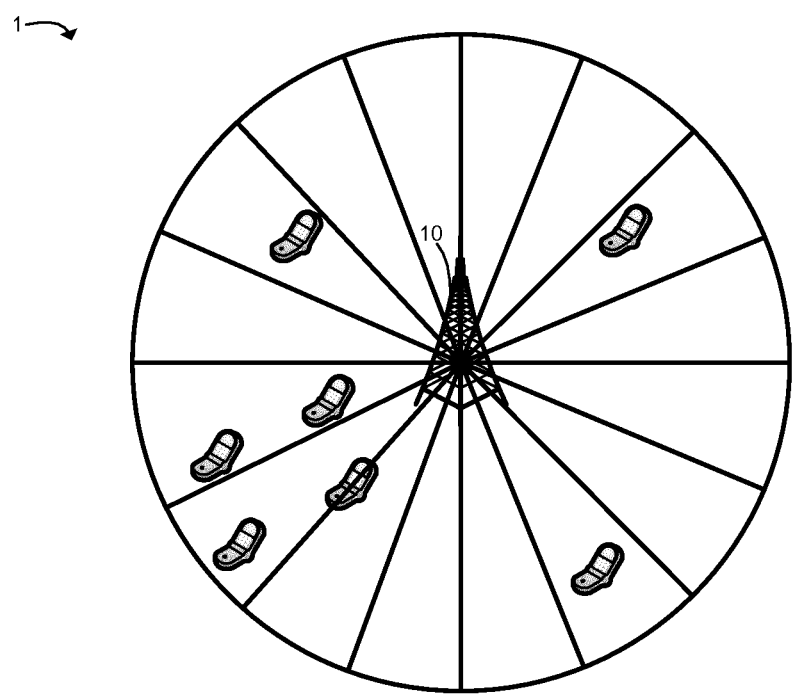
FIG. 3 is a schematic diagram illustrating a second transmission option of the base station of the network of FIG. 1.
Figure 4:
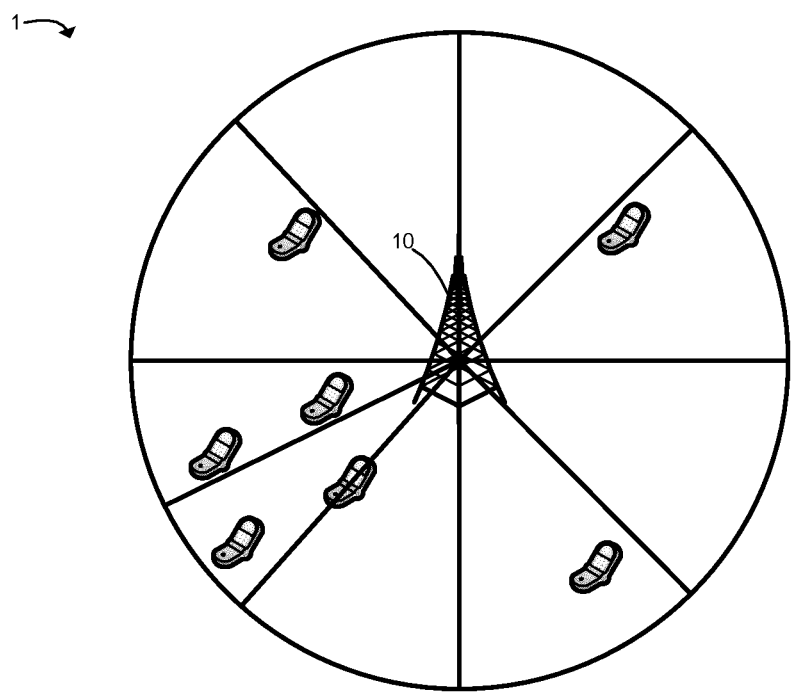
FIG. 4 is a schematic diagram illustrating a third transmission option of the base station of the network of FIG. 1.

FIGS. 2 to 4 illustrate different transmission options of the base station 10. FIG. 2 illustrates a first transmission option in which the base station 10 transmits a first plurality of beams about its overall coverage area, with each beam of the first plurality of beams having a first width (i.e. each beam subtends a first angle and has a first coverage area). FIG. 3 illustrates a second transmission option in which the base station 10 transmits a second plurality of beams about its overall coverage area, with each beam of the second plurality of beams having a second width that is relatively narrow compared to the first width (i.e. each beam of the second plurality of beams subtends a second angle that is relatively smaller than the first angle subtended by each beam of the first plurality of beams, and each beam of the second plurality of beams has a second coverage area that is relatively smaller than the first coverage area of each beam of the first plurality of beams). FIG. 4 illustrates a third transmission option in which the base station 10 transmits a third plurality of beams about its overall coverage area, in which the beams of the third plurality of beams may be either the first or second widths (i.e. each beam subtends either the first angle and first coverage area or the second angle and second coverage area). That is, the base station 10 is able to transmit beams of different widths at any particular time. The beam management method to determine which beam width should be used in any particular direction, and the processing architecture of the base station 10, will now be described.

Figure 5:
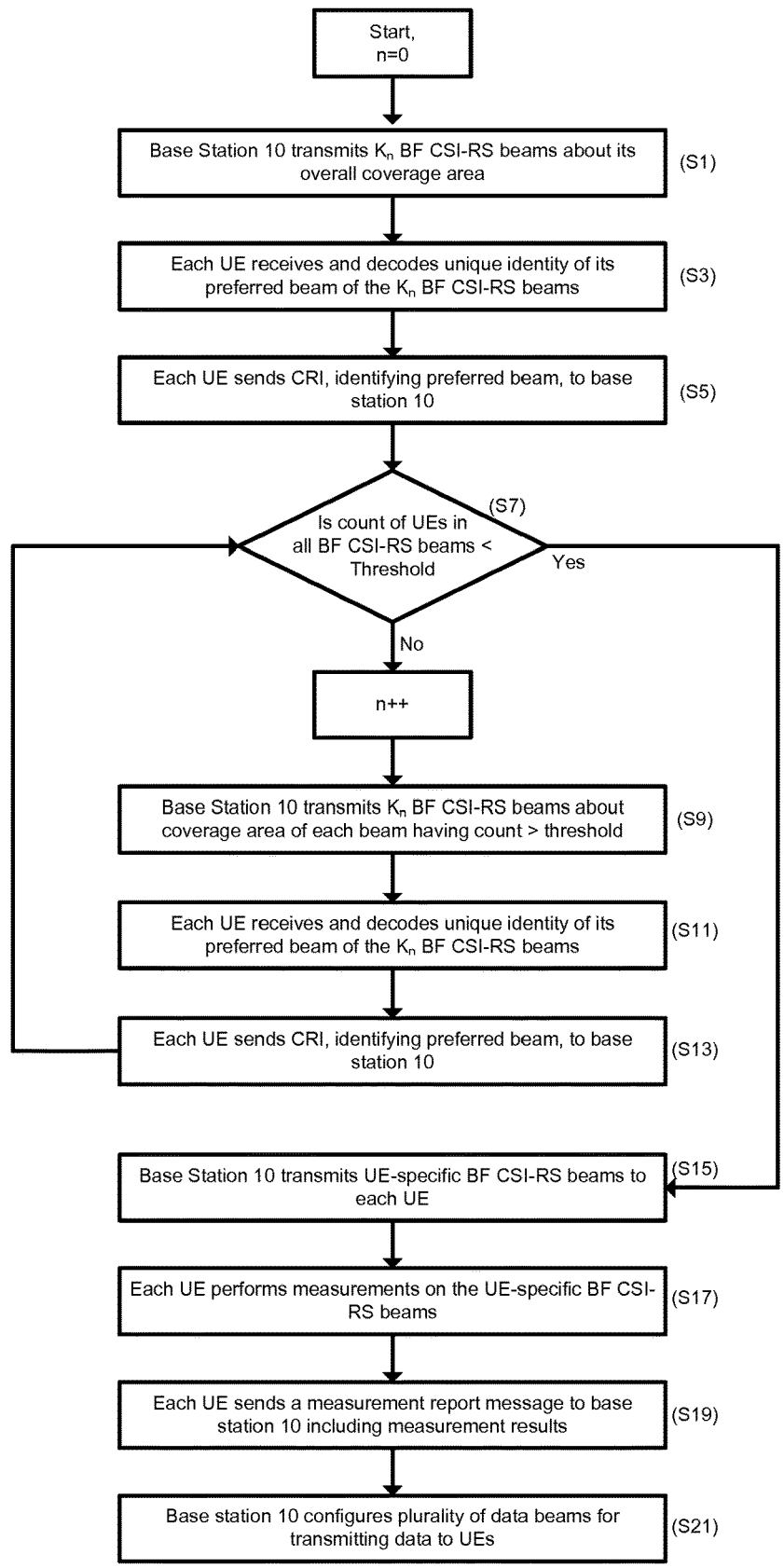
FIG. 5 is a flow diagram illustrating an embodiment of a method of the present disclosure.

FIG. 5 is a flow chart illustrating an embodiment of a beam management method of the present disclosure. In a first stage (S1), the base station 10 transmits K Beam Formed (BF) Channel State Information-Reference Symbol (CSI-RS) beams about its coverage area. This is illustrated in FIG. 2, which further illustrates the non-uniform distribution of the plurality of UEs 20 within these K BF CSI-RS beams. S1 is performed upon expiry of a timer defining a periodicity of 10 ms. Each of the K BF CSI-RS beams include an identifier uniquely identifying a beam of the K BF CSI-RS beams from any other beam and are directed in a unique direction from the base station 10. The K BF CSI-RS beams all have substantially the same width and therefore subtend approximately the same angle.

In S3, each UE of the plurality of UEs 20 receives and decodes the unique identifier for the one or more of the K BF CSI-RS beams the UE is positioned within and determines its preferred beam. If the UE receives only a single beam of the K BF CSI-RS beams, then the UE determines that to be its preferred beam. However, if the UE receives two or more beams of the K BF CSI-RS beams (e.g. it is in an overlapping coverage area of two beams), then the UE determines which of those shall be its preferred beam (e.g. based on a comparison of the Signal to Noise Ratios, SNR, of each beam). In S5, each UE sends a feedback message to the base station 10 including a CSI-RS Indicator (CRI) which includes the unique identifier for the preferred beam of the K BF CSI-RS beams. The base station 10 stores an association between each UE of the plurality of UEs and its identified preferred beam.

In S7, the base station 10 determines, for each beam of the K BF CSI-RS beams, if a count of all UEs identifying that beam as their preferred beam satisfies a predetermined threshold. This threshold is determined based on the maximum number of data streams that beam can support, which in this embodiment is 8. If the count is below the predetermined threshold, then no further processing is performed for that beam until S15. However, if the count is above the predetermined threshold, then the method proceeds to S9 for that beam. It is noted that S9 is therefore aperiodic as it is reactive to changing conditions in the network (e.g. the changing location of each UE and thus the changing count (and thus related requirements) of UEs positioned within any one of the K BF CSI-RS beams).

In S9, the base station 10 transmits $K_1$ BF CSI-RS beams about the coverage area of each beam of the K BF CSI-RS beams that exceeded the predetermined threshold. This is illustrated in FIG. 4, in which each of the $K_1$ BF CSI-RS beams are narrower than the beams of the K BF CSI-RS beams (in other words, the beams of the K BF CSI-RS are of a first width and the beams of the $K_1$ BF CSI-RS are of a second width, in which the second width is narrower than the first width). Each of the $K_1$ BF CSI-RS beams include an identifier uniquely identifying a beam of the $K_1$ BF CSI-RS beams from any other beam, and is directed in a unique direction from the base station 10.

In S11, any UE of the plurality of UEs 20 that is within one or more of the $K_1$ BF CSI-RS beams receives and decodes the associated unique identifier(s) in order to determine its preferred beam (similar to S3 above). In S13, the UE sends a feedback message to the base station 10 including a CRI which includes the unique identifier for the preferred beam of the $K_1$ BF CSI-RS beams. The base station 10 updates its memory to identify the association between each UE of the plurality of UEs and its identified preferred beam (which may now be any one of the K or $K_1$ BF CSI-RS beams for each UE).

In a second iteration of S7, the base station 10 determines, for each beam of the $K_1$ BF CSI-RS beams, if a count of all UEs identifying that beam as their preferred beam exceeds the predetermined threshold. If the count is below the predetermined threshold, then no further processing is performed for that beam until S15. However, if the count is above the predetermined threshold, then the method proceeds to S9 for that beam and a further set of $K_2$ BF CSI-RS beams are transmitted about the coverage area of each beam of the $K_1$ BF CSI-RS beams that satisfied the predetermined threshold (in which the beams of the $K_2$ BF CSI-RS beams are narrower than the beams of the $K_1$ BF CSI-RS beams). Again, the UE reports its CRI of its preferred beam of the $K_2$ BF CSI-RS beams and the base station 10 updates its association between each UE of the plurality of UEs and its identified preferred beam (which may be from the K BF CSI-RS beams, $K_1$ BF CSI-RS beams or $K_2$ BF CSI-RS beams).

Thus, as shown in FIG. 5, the method follows an iterative loop in which progressively narrower beams (i.e. subtending increasingly smaller angles and having increasingly smaller coverage areas) are transmitted to parts of the base station's overall coverage area until the number of UEs selecting each beam as their preferred beam is below the predetermined threshold.

In S15, the base station 10 transmits UE-specific BF CSI-RS beams to each UE. This step is performed periodically at an interval 2 ms following the performance of S1. In this example, these UE-specific BF CSI-RS beams are each of the first width or second width depending on whether that particular UE identified its preferred beam as one of the K or $K_1$ BF CSI-RS beams. In S17, each UE performs one or more measurement functions on the UE-specific BF CSI-RS beam to derive, for example, the Precoding Matrix Indicator (PMI), Channel Quality Indication (CQI) and/or Rank Indicator (RI). In S19, each UE sends a measurement report message to the base station 10 including, for example, the PMI, CQI and/or RI.

In S21, the base station 10 configures a plurality of data beams for transmitting data to the plurality of UEs, wherein the plurality of data beams includes one or more beams of the first width (where the count of UEs positioned within the beam of the K BF CSI-RS beams covering a particular part of the base station's coverage area was below the predetermined threshold) and one or more beams of the second (and/or third etc.) width (where the count of UEs positioned within the beam of the K BF CSI-RS beams covering a particular part of the base station's coverage area was above the predetermined threshold). Each beam of the plurality of data beams is configured based on the measurement report message from S19. In this way, the base station 10 transmits, contemporaneously to a plurality of UEs, beams of different widths (i.e. resolutions). Accordingly, in situations where there is a non-uniform distribution of UEs about a base station's coverage area, the base station 10 may automatically and dynamically detect this and use a beam of an appropriate width based on the requirements of the UEs in any particular part of the base station's coverage area. Thus, a narrower beam would cover fewer UEs so the base station 10 may serve the UEs with fewer data streams. This contrasts the prior art arrangement in which the width of each beam is the same such that the base station 10 must balance, across its whole coverage area, the requirement to provide sufficient data streams in any one part of its coverage area and the increased signaling overhead for providing narrower beams in all directions.

Figure 6:
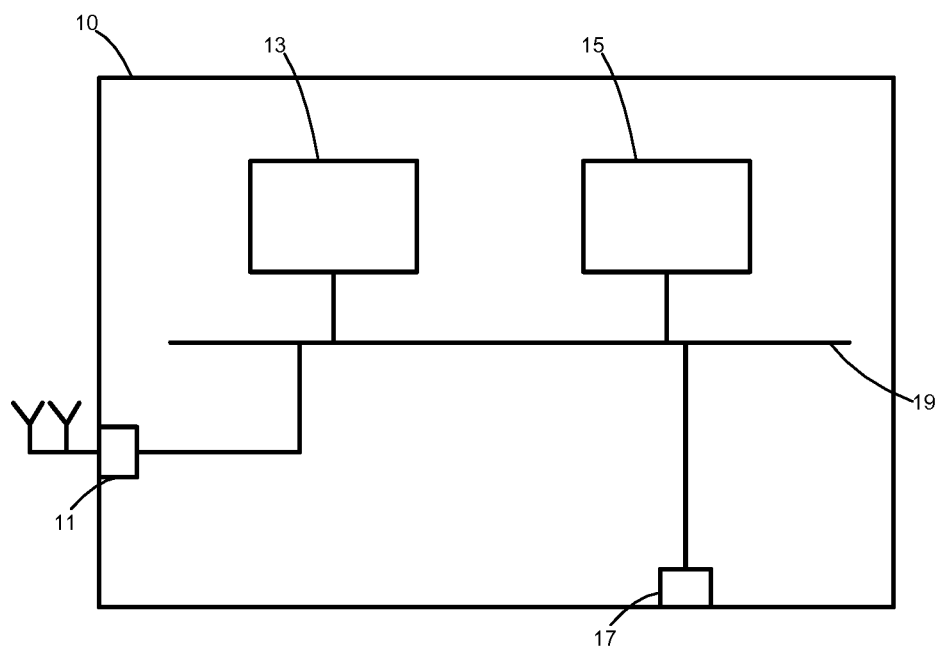
FIG. 6 is a schematic diagram illustrating the base station of the network of FIG. 1.

A more detailed schematic diagram of the base station 10 of this embodiment in shown in FIG. 6. The base station 10 includes a first communications interface 11, which in this embodiment is connected to an antenna array configured for Multiple Input Multiple Output (MIMO) mmWave transmission/reception, a processor 13, memory 15 and a second communications interface 17, which in this embodiment is an optical fiber connection to one or more core networking nodes, all connected via bus 19.

Figure 7:
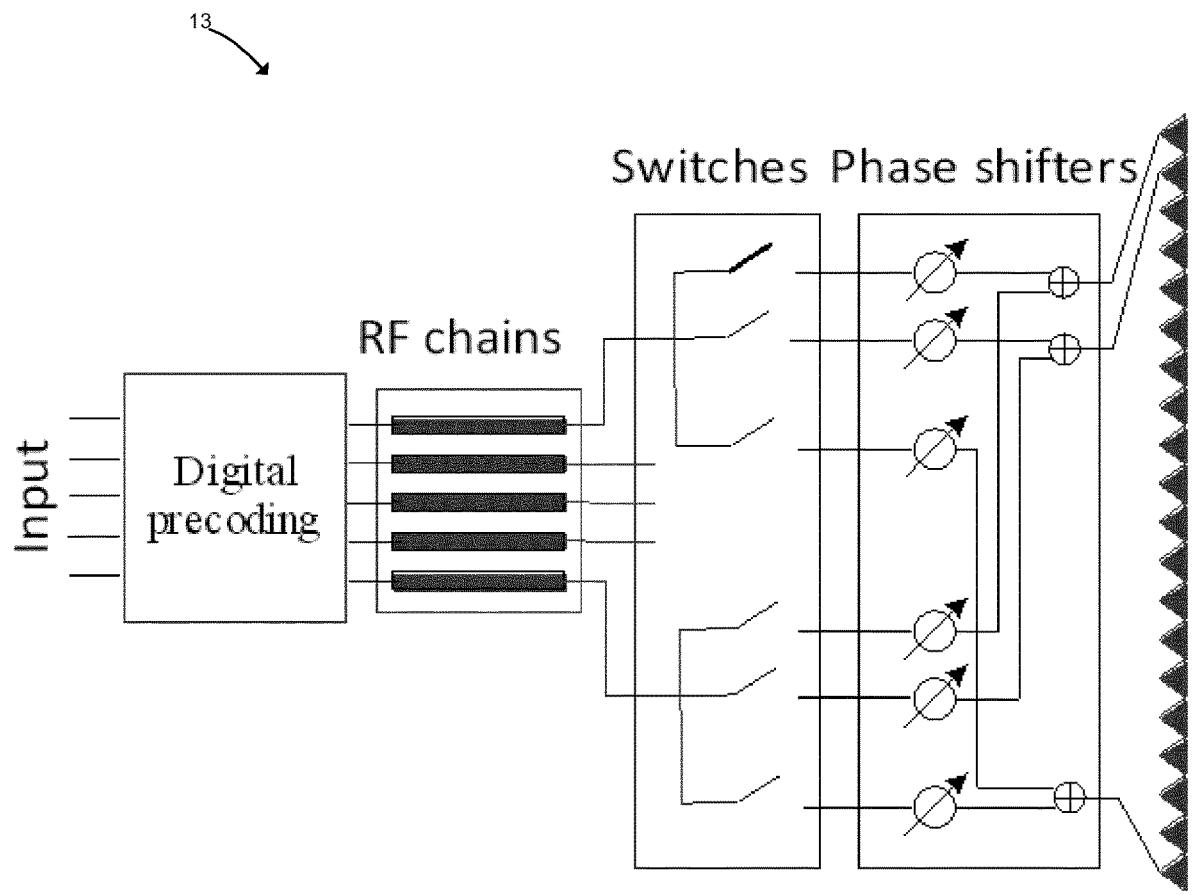
FIG. 7 is a schematic diagram illustrating the processor of the base station of FIG. 6.

The processor 13 is shown in more detail in FIG. 7. This diagram illustrates a plurality of data streams being processed by a hybrid digital/analogue architecture of processor 13 for transmission via a number of antenna ports (mapping to the antenna array connected to the first communications interface). The hybrid processing architecture includes a low-dimension digital precoder and a high-dimension analogue precoder, in which the analogue precoder includes a plurality of phase shifters. In this embodiment, a switch is added between the digital and analogue precoders, the relevance and use of which will become apparent upon review of the following theoretical explanation.

In this embodiment, the processor 13 utilizes a beamforming matrix of the following form:

$$F=F_{RF}F_{DD}$$

Where $F_{DD}$ is the digital precoding matrix and $F_{RF}$ is the analogue precoding matrix. As shown in FIG. 7, a switch is added before each phase shifter so that the entries of the analogue precoding matrix $F_{RF}$ can be either zero or a complex value with a constant magnitude. Therefore, multi-resolution beams can be generated by discrete Fourier transform (DFT) vectors with different lengths. For example, assuming that the number of antennas is 4 and the number of RF chains is 2, the analogue precoding matrix that is associated with a wide and narrow beams can be expressed as:

$$F_{RF} = \begin{bmatrix} a(\phi_1) & \\ & b(\theta_1) \\ 0 & \end{bmatrix} = \begin{bmatrix} 1 & 1 \\ -1 & -j \\ 0 & -1 \\ 0 & j \end{bmatrix}$$

where the 2×1 column vector $a(\phi_1)$ is the first column of a 2×2 DFT matrix, which is associated with a wide beam with the direction of $\phi_1$. The 4×1 column vector $b(\theta_1)$ is the first column of a 4×4 DFT matrix, which is associated with a narrow beam with the direction of $\theta_1$.

Next, we describe the design of the hybrid precoding matrix in each stage of the embodiment of the multi-resolution beam management method of the present disclosure. In S1, the analog precoding matrix is designed as $$F_{RF} = \begin{bmatrix} a(\phi_1) & a(\phi_2) & & a(\phi_k) \\ & & \cdots & \\ 0 & 0 & & 0 \end{bmatrix},$$

where K column vectors are associated with the K BF CSI-RS beams. The digital precoding matrix $F_{DD}$ is designed as an identity matrix. In S5, each UE feeds back an indicator (i.e. CRI) of its preferred beam of the K BF CSI-RS beams.

In S9, the analogue precoding matrix is designed as $$F_{RF} = [b(\theta_1)\ b(\theta_2) \ldots b(\theta_{K_1})],$$

where $K_1$ column vectors are associated with the $K_1$ BF CSI-RS beams. The digital precoding matrix $F_{DD}$ is designed as an identity matrix. In S13, each UE feeds back an indicator (i.e. CRI) of its selected preferred beam of the $K_1$ BF CSI-RS beams.

After the first and second stages, the base station 10 can obtain the CRI, which indicates the beam that is selected as the BF UE-specific CSI-RS. The BF UE-specific CSI-RS beam can be of either the first width or the second (narrower) width.

In S15, the analogue precoding matrix is designed as $$F_{RF} = [c_1\ c_2 \ldots c_U],$$

Where $c_i$ is associated with the UE-specific BF CSI-RS beam for each UE, which is selected from either $$\left\{ \begin{bmatrix} a(\phi_i) \\ 0 \end{bmatrix} \right\}_{i=1}^{K}$$

or $\{b(\theta_i)\}_{i=1}^{K_1}$ based on whether the feedback CRI identifies either a beam of the K BF CSI-RS beams or a beam of the $K_1$ BF CSI-RS beams as its preferred beam. The digital precoding matrix $F_{DD}$ is designed as an identity matrix.

In the above embodiment, the initial set of K BF CSI-RS beams are an example only and the number/width are non-essential. Any number of initial beams may be used during the beam selection process, which may be selected from a predefined set of beams. The subsequent method of beam selection will then select suitable widths for any particular area of the base station's overall coverage area.

Furthermore, it is non-essential that the base station use the iterative method of identifying a suitable beam width as detailed in the embodiment above. That is, the two stage method alone would be an improvement over the prior art method. Also, the base station 10 may also calculate the subsequent beam width based on the feedback from the UEs receiving the initial K BF CSI-RS beams (i.e. based on the number of UEs in any one beam, the UE distribution, and the system overhead for transmitting those beams).

The above embodiment is written in the context of a mmWave cellular telecommunications system. However, the skilled person will understand that the invention may be applied to any beamforming system, including those used in any other cellular telecommunications system or wireless telecommunications system.

In the above embodiment, S1 is performed periodically with a periodicity of 10 ms and S15 is performed 2 ms thereafter. However, the skilled person will understand that this is inessential and these may be performed with any suitable periodicity. In other examples, S1 is performed with a periodicity of 5 ms, 20 ms, 40 ms, 80 ms, 160 ms, 320 ms and 640 ms, and S15 is performed $\frac{1}{5}^{th}$ of that period thereafter (e.g. 1 ms, 4 ms, etc.). Furthermore, in the above embodiment, the threshold is set to 8 based on the maximum number of data streams that a beam can support. The skilled person will understand that this may be predefined based on a standard, and may also take a number between 1 and 8 inclusive.

The skilled person will understand that any combination of features is possible within the scope of the invention, as claimed.

The invention claimed is:

1. A method in a wireless telecommunications network, the network including a transceiver having a coverage area and a plurality of User Equipment (UE) within the coverage area of the transceiver, the method comprising:
   transmitting a set of first-stage beams about the coverage area of the transceiver, wherein each first-stage beam of the set of first-stage beams covers a respective first-stage beam coverage area;
   receiving data from each UE identifying a preferred beam of the set of first-stage beams, wherein a first count is the count of UEs identifying a first first-stage beam of the set of first-stage beams as their preferred beam, and a second count is the count of UEs identifying a second first-stage beam of the set of first-stage beams as their preferred beam;
   comparing the first count and the second count counts to a predetermined threshold; and
   transmitting a first data beam having a first beam coverage area being substantially equal in magnitude to the first-stage beam coverage area, and a second data beam having a second beam coverage area, wherein a magnitude of the first beam coverage area is based on the comparison of the first count to the predetermined threshold and a magnitude of the second beam coverage area is based on upon the comparison of the second count to the predetermined threshold.

2. The method as claimed in claim 1, wherein the comparing identifies that the first count is below the predetermined threshold and the second count is above the predetermined threshold, and the magnitude of the second beam coverage area is less than the magnitude of the first beam coverage area, and the method further:
   transmitting a set of second-stage beams about the coverage area of the second first-stage beam, wherein each second-stage beam of the set of second-stage beams covers a respective second-stage coverage area being substantially equal in magnitude to the second beam coverage area; and
   receiving data from each UE identifying a preferred beam of the set of second-stage beams.

3. The method as claimed in claim 2, wherein the received data further indicates a third count of UEs of the plurality of UEs disposed within a first second-stage beam of the set of second-stage beams and a fourth count of UEs of the plurality of UEs disposed within a second second-stage beam of the set of second-stage beams, and the method further comprises:
   comparing the third count and the fourth count of UEs to the predetermined threshold; and
   transmitting a set of third-stage beams about the coverage area of the second second-stage beam, wherein a first third-stage beam of the set of third-stage beams has a coverage area based upon the comparison of the third count to the predetermined threshold and a second third-stage beam of the set of third-stage beams has a coverage area based upon the comparison of the fourth count to the predetermined threshold.

4. The method as claimed in claim 1, wherein the transceiver is part of a Wireless Local Area Network (WLAN) network node.

5. The method as claimed in claim 1, wherein the transceiver is part of a cellular telecommunications network node.

6. A computer program product comprising instructions which, when the program is executed by a computer, cause the computer to carry out the method of claim 1.

7. A non-transitory computer-readable data carrier having stored thereon the computer program of claim 6.

8. A wireless telecommunications network node comprising:
 a processor and a transceiver, wherein the transceiver is configured to:
  transmit a set of first-stage beams about the coverage area of the transceiver, wherein each first-stage beam of the set of first-stage beams covers a respective first-stage beam coverage area, and
  receive data from each UE identifying a preferred beam of the set of first-stage beams;
 wherein the processor is configured to:
  determine a first count as the count of UEs identifying a first first-stage beam of the set of first-stage beams as their preferred beam, and determine a second count as the count of UEs identifying a second first-stage beam of the set of first-stage beams as their preferred beam, and
  compare the first count and the second count to a predetermined threshold; and
 wherein the transceiver is further configured to:
  transmit a first data beam having a first beam coverage area being substantially equal in magnitude to the first-stage beam coverage area, and a second data beam having a second beam coverage area, wherein a magnitude of the first beam coverage area is based on the comparison of the first count to the predetermined threshold and a magnitude of the second beam coverage area is based on upon the comparison of the second count to the predetermined threshold.

9. The wireless telecommunications network node as claimed in claim 8, wherein the processor is configured to determine that the first count is below the predetermined threshold and the second count is above the predetermined threshold such that the magnitude of the second beam coverage area is less than the magnitude of the first beam coverage area, following a positive determination that the second count is above the predetermined threshold, the transmitter is configured to transmit a set of second-stage beams about the coverage area of the second first-stage beam, wherein each second-stage beam of the set of second-stage beams covers a respective second-stage coverage area being substantially equal in magnitude to the second beam coverage area; and the processor is configured to receive data from each UE identifying a preferred beam of the set of second-stage beams.

10. The wireless telecommunications network node as claimed in claim 9, wherein the received data further indicates a third count of UEs of the plurality of UEs disposed within a first second-stage beam of the set of second-stage beams and a fourth count of UEs of the plurality of UEs disposed within a second second-stage beam of the set of second-stage beams, and the processor is configured to compare the third count and the fourth count of UEs to the predetermined threshold; and the transceiver is configured to transmit a set of third-stage beams about the coverage area of the second second-stage beam, wherein a first third-stage beam of the set of third-stage beams has a coverage area based upon the comparison of the third count to the predetermined threshold and a second third-stage beam of the set of third-stage beams has a coverage area based upon the comparison of the fourth count to the predetermined threshold.

11. The wireless telecommunications network node as claimed in claim 8, wherein the processor includes a plurality of radio frequency processing chains, a plurality of switches, and a plurality of phase shifters.

12. The wireless telecommunications network node as claimed in claim 8, wherein the wireless telecommunications network node is a Wireless Local Area Network (WLAN) networking node.

13. The wireless telecommunications network node as claimed in claim 8, wherein the wireless telecommunications network node is a cellular telecommunications networking node.

* * * * *